July 31, 1956 F. A. LEE 2,756,665
VEHICLE STRUCTURE
Filed Aug. 5, 1952 2 Sheets-Sheet 1

Inventor
Fred A. Lee
By Paul O. Pippel
Atty.

July 31, 1956      F. A. LEE      2,756,665

VEHICLE STRUCTURE

Filed Aug. 5, 1952      2 Sheets-Sheet 2

Inventor.
Fred A. Lee
By Paul O. Pippel
Atty.

United States Patent Office 2,756,665
Patented July 31, 1956

2,756,665

VEHICLE STRUCTURE

Fred A. Lee, Fort Wayne, Ind., assignor to International Harvester Company, a corporation of New Jersey Application August 5, 1952, Serial No. 302,749

10 Claims. (Cl. 98—2)

This invention relates to a novel motor vehicle body construction and more particularly to ventilating air distributing means for the operator's compartment.

It is the primary objective of the present invention to provide a structure defining the upper, forward limit of the operator's compartment fabricated out of sheet metal stampings of relatively simplified form and having edge conformations adapting them for easy joinder to mating stampings and in which the assembled stampings serve as a cold air-receiving chamber and also as a hot air-receiving chamber.

A further object is the provision of an air-receiving chamber, spaced below the windshield frame and above the hood panel, extending from one side of the operator's compartment to the opposite side adapted to receive air from without the operator's compartment and direct the same to the interior of the operator's compartment.

A still further object is to provide a hot air-receiving chamber adapted to receive heated air and direct the same rearwardly of the base of the windshield frame and is arranged in a side-by-side relation with a cold air-receiving chamber. Both of the air-receiving chambers are disposed below the windshield frame and above the hood panel and extend transversely between a pair of door pillar posts.

Another object is the provision of a vehicle body structure which is strong, rigid and durable and yet of very light weight.

The foregoing and other important objects and desirable features inherent in and encompassed by the invention, together with many of the purposes and uses thereof, will become readily apparent from a reading of the ensuing description in conjunction with the annexed drawings, in which, Figure 1 is a perspective view of the front portion of a motor truck embodying the invention;

Figures 1, 2:
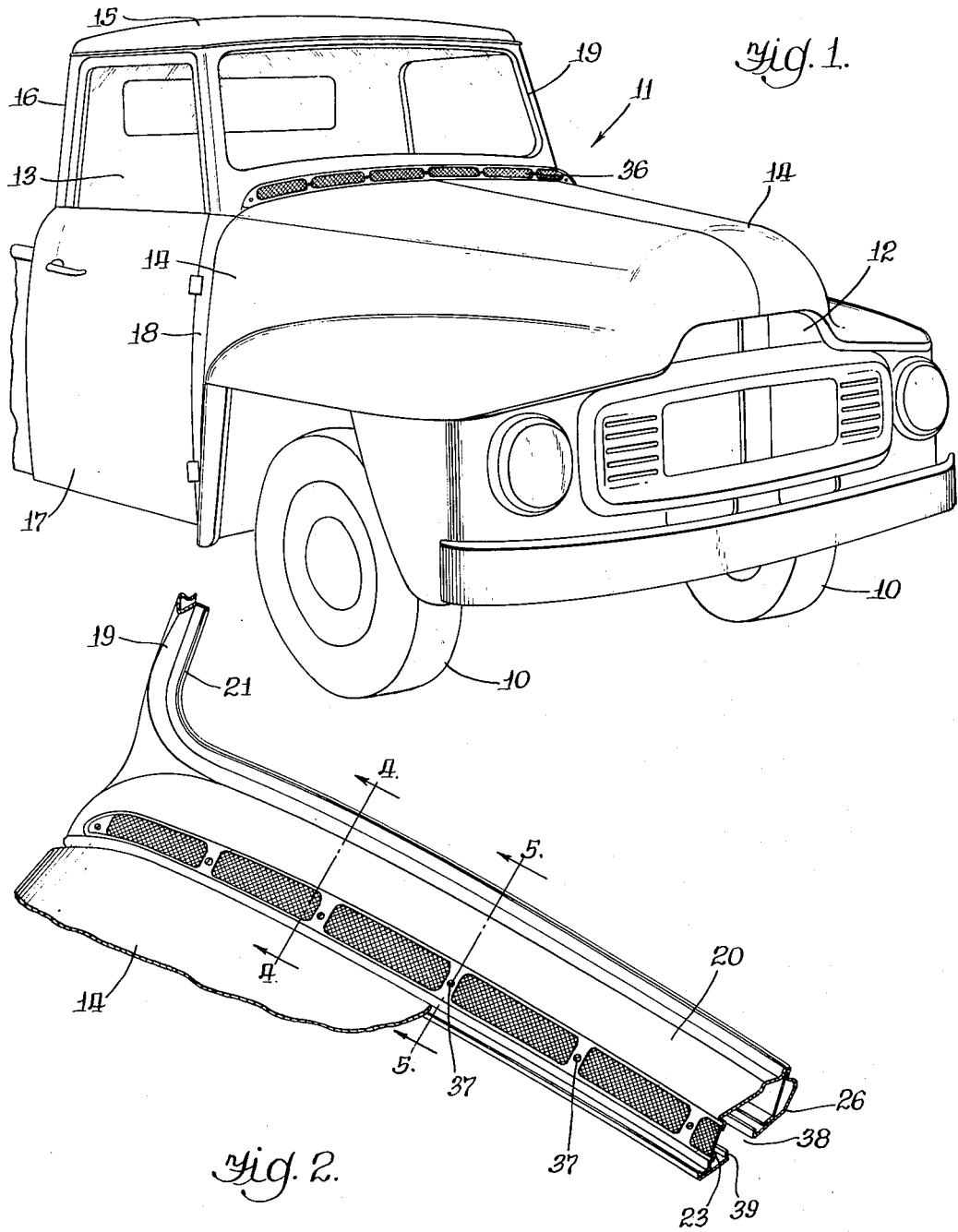
Figure 2 is a fragmentary perspective view, partially cut away, of the forward portion of the operator's compartment or cab.

Referring to the drawings in detail, wherein like reference characters designate like elements throughout the various views, there is shown a motor truck having the invention incorporated therein. The motor truck includes a chassis frame (not shown) which has its front end resiliently suspended off the road by a pair of steerable, ground-engaging wheels 10 in a conventional manner.

Mounted on the chassis frame is a vehicle body, designated generally by numeral 11. The vehicle body 11 includes an engine compartment 12 and an operator's compartment 13 longitudinally spaced rearwardly of the engine compartment. As best shown in Figure 1, the top wall of the engine compartment 12 is defined by a pair of symmetrical hood panels 14.

The operator's compartment 13 is supported on the chassis frame rearwardly of the engine and comprises a roof 15 having one end connected to a back panel 16. The sides of the operator's compartment 13 are formed by doors 17 which have their forward edges pivotally connected, respectively, to transversely spaced pillar posts 18. The windshield frame 19 is formed as a unitary stamping with a forwardly extending cowl panel 20. The top edge of the windshield frame 19 is rigidly secured to the forward edge of the roof 15 by any suitable means and the bottom ends of the unitary stamping are similarly connected to the pillar posts 18, as shown in Figure 1.

A continuous, inwardly directed flange 21 outlines the windshield opening. The cowl panel 20 includes a horizontally extending section 22, vertically spaced above the hood panels 14, and an integrally formed, inclined section 23 depending angularly from the horizontal section 22. The lower edge of the inclined section 23 is in the form of an upwardly-facing channel 24 which serves as a pocket for retaining a strip 25 of rubber or like material. As shown in Figure 2, the rearwardmost edge of the hood panels 14 is adapted to abut the strip 25 and prevent the entrance of water, dirt, etc. in the engine compartment 12.

Figure 4:
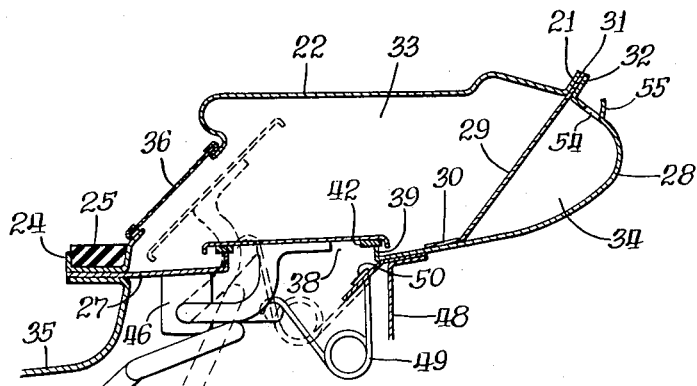
Figure 4 is a sectional view taken substantially along line 4—4 of Figure 2.
Figure 5:
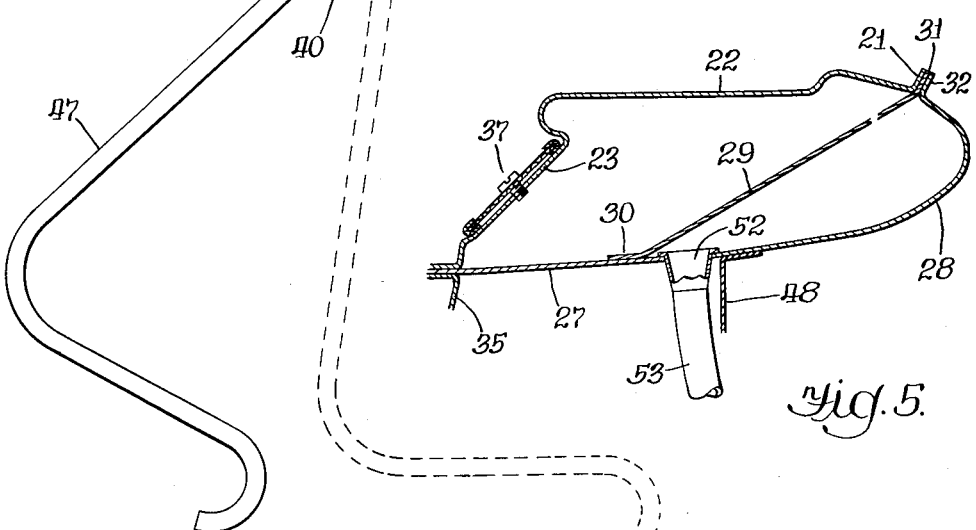
Figure 5 is a sectional view taken substantially along line 5—5 of Figure 2.

Extending transversely from one side of the operator's compartment 13 to the opposite side is a cowl bar 26 which has one edge thereof welded to the underside of the web of the channel 24. The cowl bar 26 has a rearwardly extending section 27 verically spaced below the horizontal section 22 of the cowl panel 20, and an upwardly and forwardly curved section 28, integrally formed therewith, disposed rearwardly of the windshield frame 19. A partition 29, provided with a lower flange 30 and an upper flange 31, is positioned between the cowl bar 26 and the cowl panel 20 whereby the upper flange 31 is interposed between a portion of the windshield frame flange 21 and a similar flange 32 formed on the edge of the curved section 28. Flanges 32, 31, and the portion of the flange 21 are welded together and the lower flange 30 is similarly fastened to the rearwardly extending section 27, as shown in Figures 2, 4, and 5. By virtue of the above described structure, it will be obvious that two chambers 33 and 34, extending transversely across the vehicle and arranged in a side-by-side relation, are formed. Fastened to one edge of the rearwardly extending section 27 and depending therefrom is a dash panel 35 (partially shown) which separates the engine compartment 12 from the operator's compartment 13.

A plurality of elongated, transversely spaced openings are provided in the inclined section 23. The inclined section 23 serves as the forwardly facing wall of the chamber 33 and hence it will be apparent that air is forced into the chamber 33 when the vehicle is in motion. A screen assembly 36 is fastened to the inclined section 23 by means of screws 37 to prevent bugs and other foreign elements from entering the chamber 33. The air received in the chamber 33 is discharged to the interior of the operator's compartment 13 through a pair of transversely spaced, identical ports 38 formed in the rearwardly extending section 27 of the cowl bar 26. The ports 38 are each encircled by a vertically extending lip 39 as shown in Figures 2 and 4.

Figure 3:
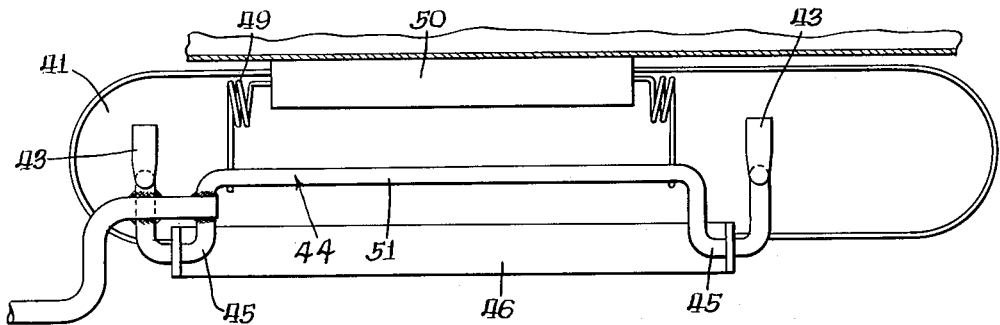
Figure 3 is a bottom view of a ventilator valve for controlling the admission of air to the operator's compartment.

In order to regulate the flow of air from the cold air-receiving chamber 33 to the interior of the operator's compartment 13 each port 38 is provided with a ventilator valve device, designated generally by numeral 40, which includes a closure member 41. A strip 42 of rubber or like material is fastened to the underside of the closure member 41 adjacent its marginal edge which is adapted to abut the lip 39 when the closure member 41 is in its closed position as shown in Figure 4. In this position air, water, and dirt are prevented from flowing through the port 38 to the interior of the operator's compartment 13. Referring to Figure 3, it will be noted that the ends 43 of a rod 44 are rigidly secured to the closure member 41. The rod 44 is formed with a pair of U-shaped portions 45 which are rotatably supported by a bracket 46 secured to the underside of the rearwardly extending section 27 of the cowl bar 26 adjacent the port 38. Attached to each rod 44 is a depending operating handle 47. The handle 47 extends downwardly between the dash panel 35 and an instrument panel 48 connected to the rearwardly extending section 27 and is conveniently grippable by the operator to rock the closure member 41 between its closed and opened positions (shown in dotted lines in Figure 4). The closure member 41 is maintained in either of its two positions of adjustment by means of an overcenter spring 49. The spring 49 is pivotally supported on a bracket 50 and has its ends engageable with the mid portion 51 of the rod 44.

The central portion of the partition 29 is bulged slightly in a forward direction and the rearwardly extending section 27 directly below the bulge is provided with an opening 52. One end of a pipe 53 is secured in the opening 52. The pipe 53 serves as an outlet for a conventional air heater (not shown). The hot air received in the chamber 34 is emitted at the base of the windshield frame 19 through a pair of elongated slots 54 formed in the curved section 28. The rearwardmost edge of each slot 54 is provided with a vertically extending baffle 55 for directing the heated air to the base of the windshield to prevent the formation of ice and moisture on the windshield.

The embodiment of the invention chosen for the purposes of illustration and description herein is that preferred for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. A motor vehicle body construction comprising an operator's compartment having a pair of transversely-spaced, vertically-extending door pillar posts on each side thereof, means defining the upper forward limit of said operator's compartment including a unitary pressed metal stamping extending between and secured to said pillar posts, said stamping being formed with a rectangular windshield frame and a forwardly extending cowl panel, said windshield frame having an inwardly directed substantially vertical flange outlining the windshield opening, said cowl panel including a horizontal section and an inclined section depending angularly therefrom, the lowermost edge of said inclined section being in the form of an upwardly facing channel, said inclined section having a plurality of screen covered, transversely spaced openings therein, sealing means retained in said channel, a hood panel having a portion of its rearmost edge adapted to rest on said sealing means, a cowl bar having one edge secured to the web of said channel, said bar being formed with a rearwardly extending section vertically spaced below said horizontal section of said cowl panel and an upwardly and forwardly curved section disposed rearwarly of said windshield frame and provided with a flange for connection with a portion of said windshield frame flange, said rearwardly extending section having ports therein, said cowl panel and bar defining a cold air-receiving chamber, manually controlled valve means for regulating the flow of air downwardly through said ports to said operator's compartment, a transversely extending wall having its upper edge secured to said windshield frame and its lower edge secured to said rearwardly extending section rearwardly of said ports and serving as the forward wall of a hot air-receiving chamber, a portion of the rearwardly extending section being constructed and arranged to serve as the bottom wall of said hot air-receiving chamber and being provided with an opening for admitting heated air to said hot air-receiving chamber, said curved section serving as a wall of said hot air-receiving chamber and having slots formed thereon for directing the heated air at the base of said windshield frame.

2. In a motor vehicle having an operator's compartment, a hood panel spaced forwardly of said operator's compartment and overlying the vehicle engine, a pair of transversely spaced, vertically extending door pillar posts on each side of said operator's compartment; a unitary pressed metal stamping extending between and secured to said pillar posts, said stamping being formed with a windshield frame and a forwardly extending cowl panel, said cowl panel including a horizontal section and an inclined section depending angularly therefrom adapted to serve as the top and forward walls, respectively, of a cold air-receiving chamber, said inclined section being provided with screened openings above said hood panel for permitting cold air to enter said cold air-receiving chamber; a cowl bar having one edge secured to said inclined section and being formed with a rearwardly extending section and an upwardly and forwardly curved section disposed rearwardly of said windshield frame, said curved section being connected to said windshield frame and serving as an upwardly facing wall of a hot air-receiving chamber, said rearwardly extending section forming the bottom wall of said cold and hot air-receiving chambers and being provided with ports for establishing air flow communication between said cold air-receiving chamber and the interior of said operator's compartment and an opening for admitting heated air to said hot air-receiving chamber, said curved section having transversely spaced slots formed therein for directing the heated air at the base of said windshield frame, and a transversely extending wall secured to said cowl bar and said windshield frame for separating said cold and hot air-receiving chambers and serving as a common wall for the chambers.

3. In a motor vehicle having an operator's compartment, a hood panel spaced forwardly of said operator's compartment and overlying the vehicle engine, a pair of transversely spaced, vertically extending door pillar posts on each side of said operator's compartment, and a windshield frame extending between and secured to said pillar posts; structure defining a cold air-receiving chamber and a hot air-receiving chamber including a forwardly extending cowl panel integrally formed with said windshield frame, said cowl panel including a horizontal section and an inclined section depending angularly therefrom, said horizontal and inclined sections being adapted to serve as the top and forward walls of the cold air-receiving chamber, respectively, said inclined section being provided with screened openings above said hood panel for permitting cold air to enter said cold air-receiving chamber, said cold air-receiving chamber further having a bottom wall vertically spaced below said cowl panel horizontal section and having an outer face which is disposed within the interior of said operator's compartment provided with ports for establishing air flow communication between said cold air-receiving chamber and the interior of said operator's compartment, said hot air-receiving chamber having a bottom wall provided with an opening therein for receiving heated air and a top wall section extending rearwardly of the base of said windshield frame having transversely spaced slots formed therein for directing the heated air discharge at the base of said windshield frame and an imperforate wall separating said cold and hot air-receiving chambers.

4. The combination as set forth in claim 3, in which manually controlled valve means are provided for regulating the flow of cold air through said ports.

5. In a motor vehicle having an operator's compartment, a hood panel spaced forwardly of said operator's compartment and overlying the vehicle engine, and a windshield frame extending transversely across the forward, upper extremity of said operator's compartment; structure defining a cold air-receiving chamber and a hot air-receiving chamber, said chambers extending transversely from side to side of said operator's compartment and being arranged in a side-by-side relation, said chambers being spaced below said windshield frame and above said hood panel, said cold air-receiving chamber having a forward wall provided with screened openings above said hood panel for receiving cold air, a bottom wall having an outer face disposed within the interior of said operator's compartment provided with ports for establishing air flow communication between said cold air-receiving chamber and the interior of said operator's compartment, and an imperforate wall separating said cold air-receiving chamber from said hot air-receiving chamber, and serving as a wall for said hot air-receiving chamber, said hot air-receiving chamber further having a bottom wall provided with an opening therein for receiving heated air and a top wall section extending rearwardly of the base of said windshield frame having slots formed therein for directing the heated air discharge at the base of said windshield frame.

6. The combination as set forth in claim 5 in which manually controlled valve means are provided for regulating the flow of cold air through said ports.

7. In a motor vehicle having an operator's compartment, a hood panel longitudinally spaced forwardly of said operator's compartment and overlying the vehicle engine, and a windshield frame extending transversely across the forward, upper extremity of said operator's compartment; structure defining a cold air-receiving chamber longitudinally spaced between said windshield frame and said hood panel having a wall provided with openings for admitting air from without the operator's compartment to said cold air-receiving chamber, said chamber being further defined by another wall having an outer face disposed within the interior of said operator's compartment, said last mentioned wall being provided with ports for establishing air flow communication between said cold air-receiving chamber and the interior of said operator's compartment and said structure further defining a hot air-receiving chamber having a bottom wall provided with an opening therein for receiving heated air and a top wall section extending rearwardly of the base of said windshield frame having slots formed therein for directing the discharge of heated air rearwardly of the base of said windshield frame, said chambers being spaced below said windshield frame and above said hood panel and having a common imperforate wall separating them.

8. The combination as set forth in claim 7, in which said chambers extend transversely from side to side of said operator's compartment and are arranged in a side-by-side relation.

9. In a motor vehicle having an operator's compartment, a hood panel spaced forwardly of said operator's compartment and overlying the vehicle engine, and a windshield frame extending transversely across the forward, upper extremity of said operator's compartment; structure defining a cold air-receiving chamber and a hot air-receiving chamber; and means for permitting air to said hood panel and the base of said windshield frame, said wall separating said chambers from the interior of said operator's compartment, said wall having ports for establishing air flow communication between said cold air receiving chamber and the interior of said operator's compartment, said wall further having an opening for admitting heated air to said hot air receiving chamber and slots adjacent the base of said windshield frame for the passage of heated air therefrom, said chambers extending transversely from side to side of said operator's compartment and being arranged in a side-by-side relation, said chambers being spaced below said windshield frame and above said hood panel, said structure including a transversely extending imperforate wall separating said chambers, said cold air-receiving chamber having a forwardly facing wall provided with screened openings above said hood panel for receiving cold air.

10. In a motor vehicle having an operator's compartment, a hood panel spaced forwardly of said operator's compartment and overlying the vehicle engine, and a windshield frame extending transversely across the forward, upper extremity of said operator's compartment; structure defining a cold air-receiving chamber and a hot air-receiving chamber, said chambers extending transversely from side to side of said operator's compartment and being arranged in a side-by-side relation, said chambers being spaced below said windshield frame and above said hood panel, said structure including a panel extending between said hood panel and said windshield frame and separating said chambers from the interior of said operator's compartment, said panel being provided with apertures for air flow communication between said chambers and the interior of said operator's compartment, said panel having means for introducing heated air to said hot air-receiving cahmber; and means for permitting air to enter said cold air-receiving chamber.

References Cited in the file of this patent

UNITED STATES PATENTS

| | | |
|---|---|---|
| 2,045,044 | Modine | June 23, 1936 |
| 2,045,578 | Buford | June 30, 1936 |
| 2,060,923 | Breese | Nov. 17, 1936 |
| 2,124,925 | McNeal | July 26, 1938 |
| 2,173,893 | Wermich | Sept. 26, 1939 |
| 2,304,643 | Hans | Dec. 8, 1942 |
| 2,367,904 | Ulrich | Jan. 23, 1945 |
| 2,510,790 | Arnold | June 6, 1950 |
| 2,613,985 | Ulrich | Oct. 14, 1952 |

FOREIGN PATENTS

| | | |
|---|---|---|
| 413,910 | Great Britain | July 26, 1934 |